(12) United States Patent
Hayakawa

(10) Patent No.: US 11,070,960 B2
(45) Date of Patent: Jul. 20, 2021

(54) COMMUNICATION DEVICE

(71) Applicant: Sumitomo Electric Industries, Ltd., Osaka (JP)

(72) Inventor: Jun Hayakawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/759,591

(22) PCT Filed: Aug. 25, 2016

(86) PCT No.: PCT/JP2016/074828
§ 371 (c)(1),
(2) Date: Mar. 13, 2018

(87) PCT Pub. No.: WO2017/047351
PCT Pub. Date: Mar. 23, 2017

(65) Prior Publication Data
US 2018/0262886 A1    Sep. 13, 2018

(30) Foreign Application Priority Data
Sep. 14, 2015    (JP) .............................. JP2015-181008

(51) Int. Cl.
*H04W 4/02*        (2018.01)
*H04W 4/024*       (2018.01)
*H04W 4/40*        (2018.01)
*H04W 4/44*        (2018.01)
*H04L 12/28*       (2006.01)
*H04L 12/46*       (2006.01)
(Continued)

(52) U.S. Cl.
CPC ............... *H04W 4/40* (2018.02); *H04L 12/28* (2013.01); *H04L 12/4625* (2013.01); *H04W 4/024* (2018.02); *H04W 4/027* (2013.01); *H04W 4/44* (2018.02); *H04W 48/18* (2013.01); *H04W 84/12* (2013.01); *H04W 88/02* (2013.01); *H04W 88/06* (2013.01)

(58) Field of Classification Search
CPC .... H04L 12/28; H04L 12/4625; H04W 4/027; H04W 4/40; H04W 48/18; H04W 84/12; H04W 88/02; H04W 88/06
USPC .................................................. 370/254, 338
See application file for complete search history.

(56) References Cited

U.S. PATENT DOCUMENTS 9,108,561 B2 * 8/2015 Nakamura ............... B60Q 9/00
9,204,447 B2 * 12/2015 Isu ......................... H04W 36/32
(Continued)

FOREIGN PATENT DOCUMENTS

CN    104160433 A    11/2014
JP    2001-283379 A  10/2001
(Continued)

*Primary Examiner* — Melvin C Marcelo
*Assistant Examiner* — Natali Pascual Peguero
(74) *Attorney, Agent, or Firm* — Baker Botts L.L.P.; Michael A. Sartori

(57) ABSTRACT

A communication device mounted on a vehicle includes a plurality of communication units that are different in width of a communicable range, a determination unit that determines a running state of a vehicle, a selection unit that selects at least one of the plurality of communication units according to a determination result from the determination unit, and a stop unit that stops operation of the communication unit selected by the selection unit.

3 Claims, 4 Drawing Sheets

(51) Int. Cl.
*H04W 48/18* (2009.01)
*H04W 88/06* (2009.01)
*H04W 84/12* (2009.01)
*H04W 88/02* (2009.01)

(56) References Cited

U.S. PATENT DOCUMENTS

| | | | | |
|---|---|---|---|---|
| 2011/0095905 A1* | 4/2011 | Mase | ................... | G01C 21/32 |
| | | | | 340/901 |
| 2011/0257834 A1* | 10/2011 | Hebb | ................... | G06Q 10/08 |
| | | | | 701/31.4 |
| 2011/0276218 A1* | 11/2011 | Dwan | ................... | G07C 5/008 |
| | | | | 701/29.5 |
| 2013/0028184 A1* | 1/2013 | Lee | ........................ | H04W 4/70 |
| | | | | 370/328 |
| 2014/0288774 A1* | 9/2014 | Morita | ............ | G08G 1/096783 |
| | | | | 701/36 |
| 2018/0213503 A1* | 7/2018 | Garg | ................... | H04W 64/006 |

FOREIGN PATENT DOCUMENTS

| | | |
|---|---|---|
| JP | 2002-261677 A | 9/2002 |
| JP | 2004-042851 A | 2/2004 |
| JP | 2010-245825 A | 10/2010 |
| JP | 2013-017044 A | 1/2013 |
| JP | 2014-206543 A | 10/2014 |
| JP | 2015-071320 A | 4/2015 |

\* cited by examiner

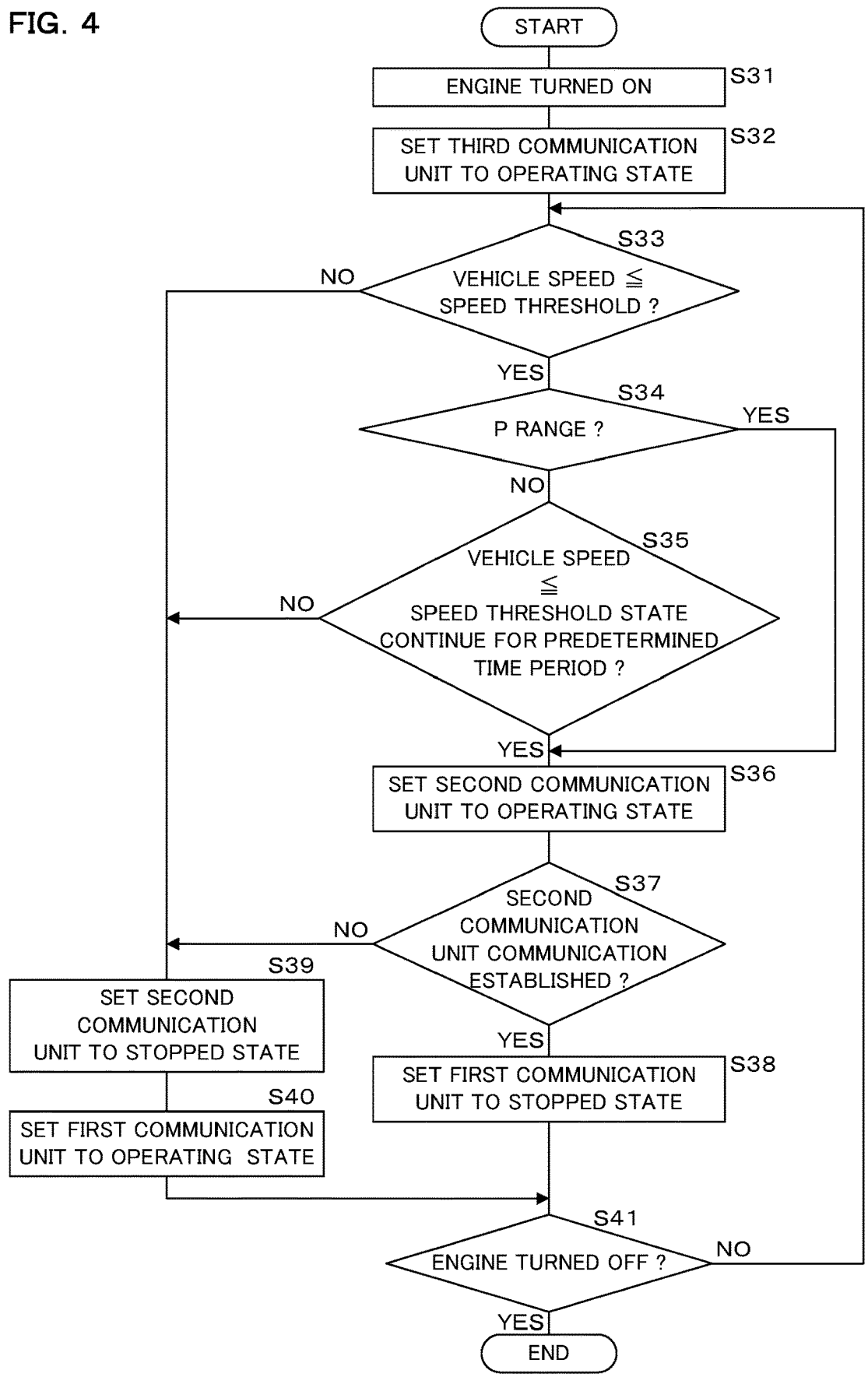

COMMUNICATION DEVICE

CROSS-REFERENCE TO RELATED APPLICATIONS

This application is the national phase under 35 U.S.C. § 371 of PCT International Application No. PCT/JP2016/074828 which has an International filing date of Aug. 25, 2016 and designated the United States of America.

FIELD

The present invention relates to a communication device.

The present application claims the benefit of Japanese Patent Application No. 2015-181008 filed on Sep. 14, 2015, the entire contents of which are hereby incorporated by reference.

BACKGROUND

With the recent progress of information technology (IT), a technique of allowing a vehicle such as an automobile to acquire required information from the outside has been developed in order to assist safe, secure and comfortable driving.

Disclosed is an information distribution system including a distribution server for distributing telematics information including traffic information to an on-vehicle communication device, for example (see Japanese Patent Application Laid-Open No. 2014-206543).

SUMMARY

The communication device according to the present disclosure is a communication device mounted on a vehicle comprising: a plurality of communication units that are different in width of a communicable range; a determination unit that determines a running state of a vehicle; a selection unit that selects at least one of the plurality of communication units according to a determination result from the determination unit; and a stop unit that stops operation of the communication unit selected by the selection unit.

The above and further objects and features of the invention will more fully be apparent from the following detailed description with accompanying drawings.

BRIEF DESCRIPTION OF THE DRAWINGS

FIG. 4 is a flowchart illustrating the second example of the processing procedure performed by the communication device according to the present embodiment.

DETAILED DESCRIPTION

Figure 1:
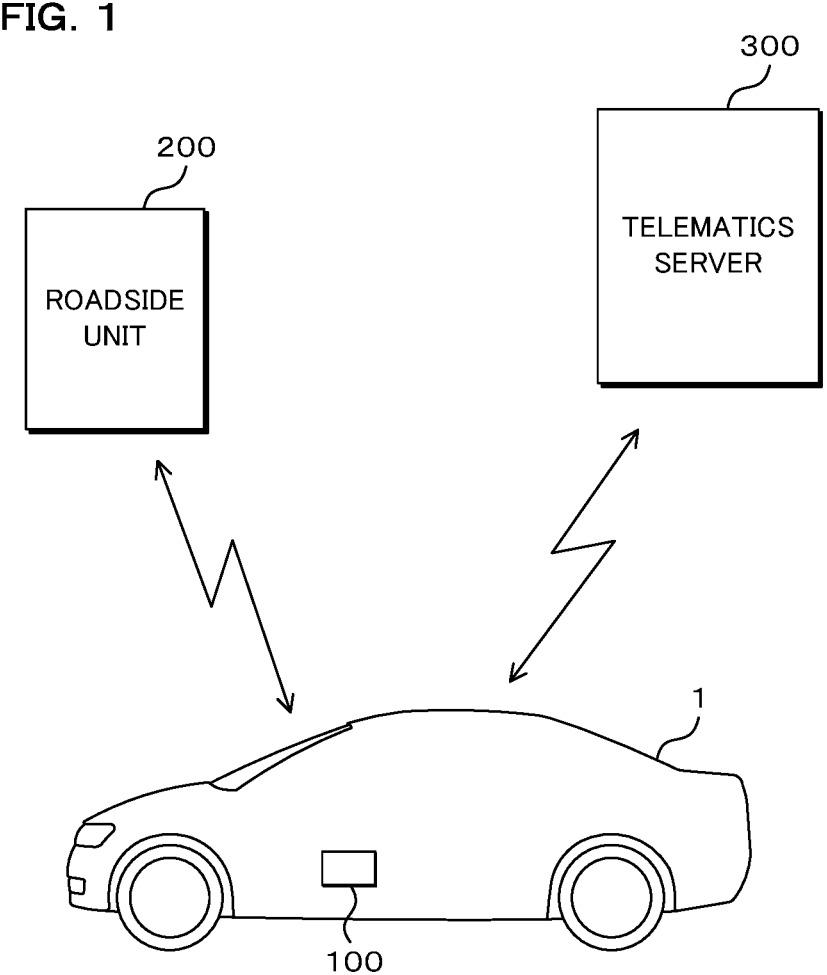
FIG. 1 is a schematic view illustrating one example of communication performance by a communication device 100 according to an embodiment.

In a system as disclosed in Japanese Patent Application Laid-Open No. 2014-206543, an on-vehicle communication device has various kinds of wireless communication systems for making communications with the inside the vehicle and with the outside the vehicle, and is equipped with multiple wireless modules (communication units). Thus, continuous communication operations by all the wireless modules may heighten electric power consumption and increase heat generation.

Here, the object is to provide a communication device that achieves lower electric power consumption and less heat generation.

According to the present disclosure, it is possible to lower the electric power consumption and reduce heat generation.

A communication device according to the present embodiment is mounted on a vehicle, and comprises a plurality of communication units that are different in width of a communicable range; a determination unit that determines a running state of a vehicle; a selection unit that selects at least one of the plurality of communication units according to a determination result from the determination unit; and a stop unit that stops operation of the communication unit selected by the selection unit.

The plurality of communication units are different in width of the communicable range. The determination unit determines the running state of a vehicle. The running state of the vehicle is whether the vehicle is running or stopped, for example. The selection unit selects at least one of the plurality of communication units according to a determination result from the determination unit. The stop units stops operation of the communication unit selected by the selection unit. The operation of at least one of the communication units is stopped depending on the running state of the vehicle, which enables less electric power consumption and less heat generation than those when all the communication units are operated.

In the communication device according to the present embodiment, the determination unit determines the speed of the vehicle, and the selection unit selects a communication unit having a narrow communicable range in the case where the speed of the vehicle is equal to or less than a predetermined speed threshold.

The determination unit determines the speed of the vehicle. The selection unit selects the communication unit having a narrow communicable range in the case where the speed of the vehicle is equal to or less than a predetermined speed threshold (which may be assumed as 0 km/h, for example). An example of the communication unit with a narrow communicable range is a communication unit making communication employing a wireless LAN network. In other words, in the case where the vehicle is stopped, the communication in a narrow communicable range can be established. Thus, by setting the communication unit having a narrow communicable range to an operating state while setting the communication unit having a wide communicable range to a stopped state, electric power consumption in the communication units and heat generation may be reduced.

In the communication device according to the present embodiment, the selection unit selects a communication unit having a wide communicable range in the case where the speed of the vehicle is above the speed threshold.

The selection unit selects the communication unit having a wide communicable range in the case where the speed of the vehicle is above the speed threshold (which may be assumed as 0 km/h, for example). An example of the communication unit having a wide communicable range is a communication unit that makes communication employing a mobile phone network. In other words, in the case where the vehicle is running, the communication in a narrow communicable range is hard to be established. Thus, by setting the communication unit having a narrow communicable range to the stopped state while setting the communication unit having a wide communicable range to the operating state, electric power consumption in the communication units and heat generation may be reduced.

The communication device according to the present embodiment further comprises an acquisition unit that acquires a parking manipulation, and the selection unit further selects a communication unit having a narrow communicable range in the case where a parking manipulation is acquired by the acquisition unit.

The acquisition unit acquires a parking manipulation. The parking manipulation includes a manipulation of moving a shift lever to a parking position (P range, for example) and a manipulation of applying a handbrake, for example. The selection unit further selects a communication unit having a narrow communicable range in the case where a parking manipulation is acquired by the acquisition unit. The acquisition of the parking manipulation enables the determination that the vehicle is stopped with more certainty.

Hereinafter, an embodiment of the communication device according to present invention will be described in detail with reference to the drawings. FIG. 1 is a schematic view illustrating one example of communication performance by a communication device 100 according to the present embodiment. As illustrated in FIG. 1, the communication device 100 according to the present embodiment is mounted on a vehicle 1 and is able to communicate with a roadside unit 200 and a telematics server 300.

The telematics server 300 is a server for distributing or providing telematics information to the vehicle 1. The telematics server 300 can collect probe information from a probe vehicle and send recommended route information, traffic information or the like in response to a request from the vehicle 1. For the communication between the vehicle 1 and the telematics server 300, a mobile telephone network having a frequency band ranging from 800 MHz to 2 GHz (Long Term Evolution (LTE), 4G, 3G or the like) or a wireless LAN having a frequency band of 2.4 GHz (WiFi or the like) may be employed.

The roadside unit 200 is a device associated with Intelligent Transport System (ITS) radio communication, for example, and for the communication between the vehicle 1 and the roadside unit 200, ITS radio communication having a frequency band of 5.9 GHz, for example, may be employed.

Figure 2:
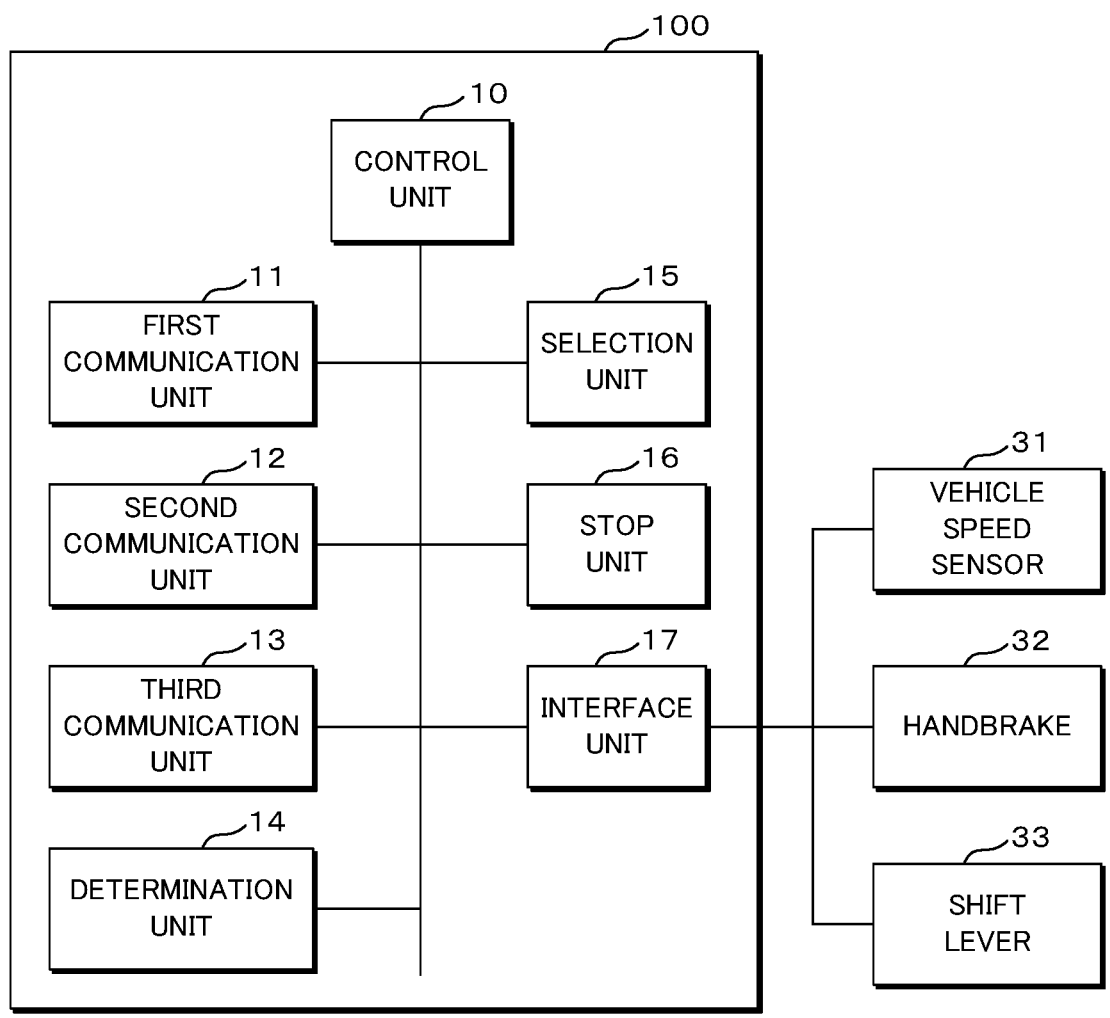
FIG. 2 is a block diagram illustrating one example of a configuration of the communication device according to the present embodiment.

FIG. 2 is a block diagram illustrating one example of a configuration of the communication device 100 according to the present embodiment. As illustrated in FIG. 2, the communication device 100 includes a control unit 10 for controlling the entire device, a first communication unit 11, a second communication unit 12, a third communication unit 13, a determination unit 14, a selection unit 15, a stop unit 16, an interface unit 17 and so forth. The interface unit 17 is connected with a vehicle speed sensor 31, a handbrake 32 and a shift lever 33.

The first communication unit 11 functions as a communication unit having a wide communicable range. The first communication unit 11 employs a mobile phone network having a frequency band ranging from 800 MHz to 2 GHz, for example, (such as Long Term Evolution (LTE)).

The second communication unit 12 functions as a communication unit having a narrow communicable range. The second communication unit 12 employs a wireless LAN having a frequency band of 2.4 GHz, for example (such as WiFi).

The third communication unit 13 has a moderate communicable range between the first communication unit 11 and the second communication unit 12 and employs ITS radio communication having a frequency band of 5.9 GHz, for example.

The interface unit 17 acquires vehicle speed information from the vehicle speed sensor 31. The interface unit 17 also functions as an acquisition unit for acquiring a parking manipulation from at least one of the handbrake 32 and the shift lever 33. The parking manipulation includes, for example, a manipulation of moving the shift lever 33 to a parking position (P range, for example) and a manipulation of applying the handbrake 32.

The determination unit 14 determines a running state of the vehicle 1. The running state of the vehicle 1 is whether the vehicle 1 is running or stopped, for example.

The selection unit 15 selects at least one of the first communication unit 11 and the second communication unit 12 according to the determination result from the determination unit 14.

The stop unit 16 stops the operation of at least one of the first communication unit 11 and the second communication unit 12 that is selected by the selection unit 15. The operation of at least one of the communication units is stopped depending on the running state of the vehicle 1, which enables less electric power consumption and less heat generation than those when all the communication units are operated.

More specifically, the determination unit 14 determines the speed of the vehicle 1 based on the vehicle speed information acquired by the interface unit 17. The selection unit 15 then selects the second communication unit 12 having a narrow communicable range in the case where the speed of the vehicle 1 is equal to or less than a predetermined speed threshold (which may be assumed as 0 km/h, for example).

In other words, in the case where the vehicle 1 is stopped, the communication in a narrow communicable range can be established. Thus, by setting the second communication unit 12 having a narrow communicable range to an operating state while setting the first communication unit 11 having a wide communicable range to a stopped state, electric power consumption in the communication units and heat generation may be reduced.

In addition, by setting the first communication unit 11 to a stopped state while setting the second communication unit 12 to an operating state, the communication employing a mobile phone network may be stopped in the case where communication employing a wireless LAN network is allowable, for example. This makes it possible to reduce the amount of the data transfer using the mobile phone network and thereby to reduce the traffic.

The selection unit 15 selects the first communication unit 11 having a wide communicable range in the case where the speed of the vehicle 1 is above the speed threshold (which may be assumed as 0 km/h, for example).

In other words, in the case where the vehicle 1 is running, the communication in a narrow communicable range is hard to be established. Thus, by setting the second communication unit 12 having a narrow communicable range to a stopped state, and setting the first communication unit 11 having a wide communicable range to an operating state, electric power consumption in the communication units and heat generation may be reduced.

The selection unit 15 selects the second communication unit 12 having a narrow communicable range in the case where a parking manipulation is acquired by the interface unit 17. The stop unit 16 stops the operation of the selected first communication unit 11. The acquisition of the parking manipulation enables the determination that the vehicle is stopped with more certainty. In the case where the vehicle 1 is stopped, the communication in a narrow communicable range can be established. Thus, by setting the second communication unit 12 having a narrow communicable range to an operating state while setting the first communication unit 11 having a wide communicable range to a stopped state, electric power consumption in the communication units and heat generation may be reduced.

In the present embodiment, in the case where the first communication unit 11 is set to a stopped state while the second communication unit 12 is set to an operating state, communication may not be established at the position where the vehicle 1 is stopped because of the relatively narrow communicable range of the second communication unit 12. In such a case, by setting the second communication unit 12 to a stopped state while setting the first communication unit 11 to an operating state, electric power consumption in the communication units and heat generation may be reduced.

Figure 3:
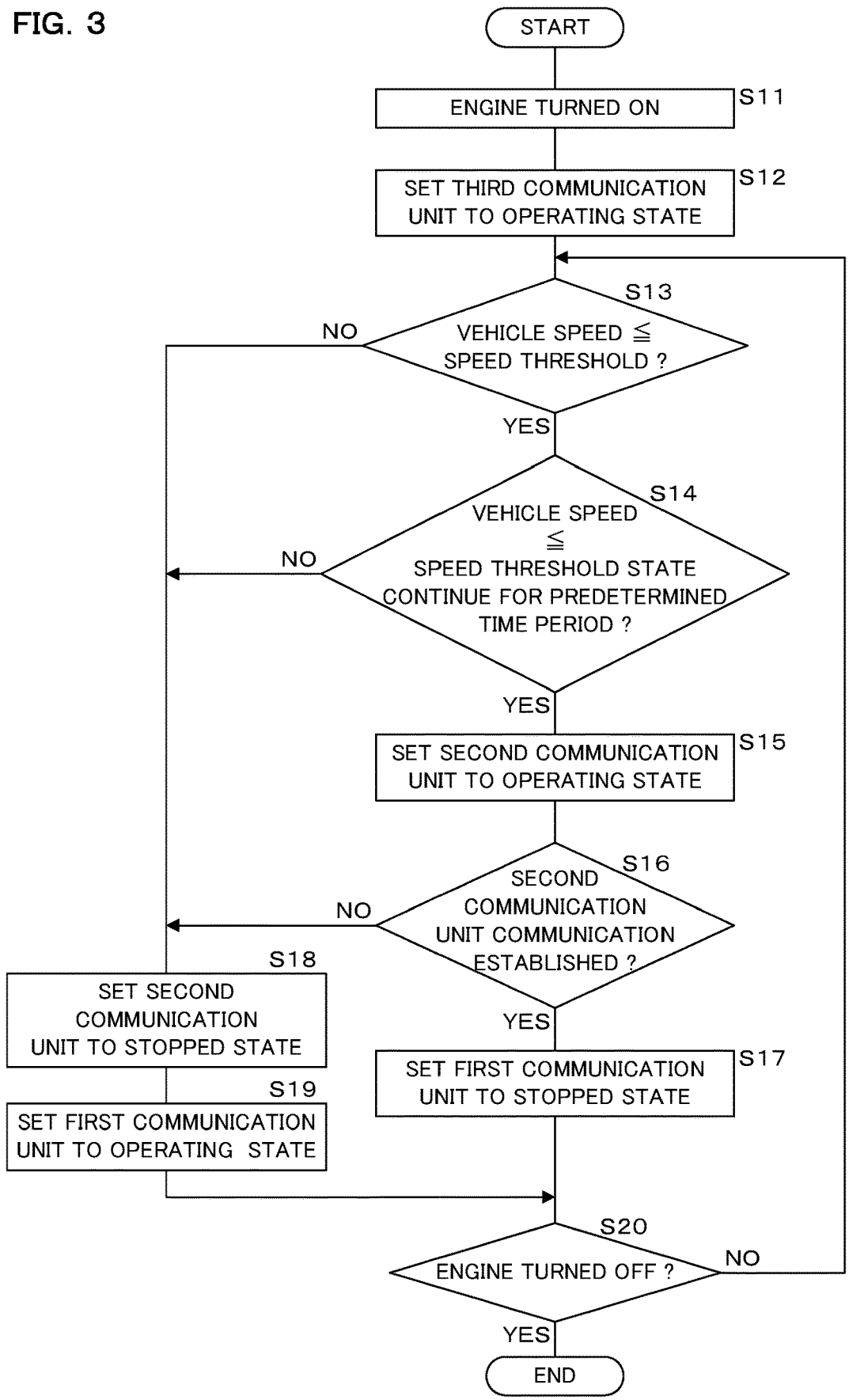
FIG. 3 is a flowchart illustrating the first example of the processing procedure performed by the communication device according to the present embodiment.

The following describes operation of the communication device 100 in the present embodiment. FIG. 3 is a flowchart illustrating the first example of the processing procedure performed by the communication device 100 according to the present embodiment. The following description is made regarding the control unit 10 as the subject of the processing for the sake of convenience. The control unit 10 sets the third communication unit to an operating state (S12) when the engine is turned on (S11).

The control unit 10 determines whether or not the vehicle speed is equal to or less than the speed threshold (for example, 0 km/h) (S13). If it is determined that the vehicle speed is equal to or less than the speed threshold (YES at S13), it is determined whether or not the state where the vehicle speed is equal to or less than the speed threshold continues for a predetermined time period (about 30 seconds, for example) (S14). If it is determined that the state where the vehicle speed is equal to or less than the speed threshold continues for a predetermined time period (YES at S14), the control unit 10 sets the second communication unit to an operating state. It is noted that setting to an operating state means to start the operation in the case where the operation is stopped and means to continue the operation in the case where the operation is being performed.

The control unit 10 determines whether or not the communication by the second communication unit is established (S16). If it is determined that the communication is established (YES at S16), the control unit 10 sets the first communication unit to a stopped state (S17), and executes the processing at step S20 described below. It is noted that setting to a stopped state means to stop the operation in the case where the operation is performed and means to continue the stopped state in the case where the operation is being stopped.

If it is determined that the vehicle speed is not equal to or less than the speed threshold (NO at S13), if it is determined that the state where the vehicle speed is equal to or less than the speed threshold does not continue for a predetermined time period (NO at S14), or if it is determined that the communication by the second communication unit is not established (NO at S16), the control unit 10 sets the second communication unit to a stopped state (S18), sets the first communication unit to an operating state (S19), and executes the processing at step S20 described below.

The control unit 10 determines whether or not the engine is turned off (S20). If it is determined that the engine is not turned off (NO at S20), the processing at and after the step S13 is repeated. If it is determined that the engine is turned off (YES at S20), the processing is ended.

FIG. 4 is a flowchart illustrating the second example of the processing procedure performed by the communication device 100 according to the present embodiment. The control unit 10 sets the third communication unit to the operating state (S32) when the engine is turned on (S31).

The control unit 10 determines whether or not the vehicle speed is equal to or less than the speed threshold (for example, 0 km/h) (S33). If it is determined that the vehicle speed is equal to or less than the speed threshold (YES at S33), the control unit 10 determines whether or not the shift lever is positioned in a P range (parking position) (S34). If it is determined that the shift lever is not positioned in the P range (NO at S34), the control unit 10 determines whether or not the state where the vehicle speed is equal to or less than the speed threshold continues for a predetermined time period (about 30 seconds, for example) (S35). If it is determined that the state where the vehicle speed is equal to or less than the speed threshold continues for a predetermined time period (YES at S35), the control unit 10 sets the second communication unit to the operating state (S36).

If the shift lever is positioned in the P range (YES at S34), the control unit 10 executes the processing at step S36 without executing the processing at step S35. The control unit 10 determines whether or not the communication by the second communication unit is established (S37). If it is determined that the communication is established (YES at S37), the control unit 10 sets the first communication unit to the stopped state (S38) and executes the processing at step S41 described below.

If it is determined that the vehicle speed is not equal to or less than the speed threshold (NO at S33), if it is determined that the state where the vehicle speed is equal to or less than the speed threshold does not continue for a predetermined time period (NO at S35), or if it is determined the communication by the second communication unit is not established (NO at S37), the control unit 10 sets the second communication unit to a stopped state (S39), sets the first communication unit to an operating state (S40) and executes the processing at step S41 described below.

The control unit 10 determines whether or not the engine is turned off (S41). If it is determined that the engine is not turned off (NO at S41), the processing at and after the step S33 is repeated. If it is determined that the engine is turned off (YES at S41), the processing is ended.

In the above-described embodiment, the communication unit employing a mobile phone network is described as the communication unit having a wide communicable range, but the communication in a wide communicable range is not limited to the communication employing the mobile phone network. Furthermore, in the above-described embodiment, the communication unit employing a wireless LAN network is described as the communication unit having a narrow communicable range, but the communication of the narrow communicable range is not limited to the communication employing a wireless LAN network.

It is to be understood that the embodiments herein disclosed are illustrative in all respects and not restrictive. The scope of the present invention is defined by the appended claims rather than by the description preceding them, and all changes that fall within the meanings and the bounds of the claims, or equivalence of such meanings and bounds are intended to be embraced by the claims. It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication device mounted on a vehicle comprising:
   a first communication unit that is compliant with a first wireless communication standard, and is not compliant with a second wireless communication standard having a narrower communicable range than the first wireless communication standard;
   a second communication unit that is compliant with the second wireless communication standard, and is not compliant with the first wireless communication standard, and is capable of operating simultaneously with the first communication unit; and
   a control unit that determines a running state of the vehicle based on a speed of the vehicle and a speed threshold for determining whether of the vehicle is running or stopped, and executes switching control between operating states of the first and second communication units based on the determined running state; wherein
   the switching control between the operating states is a control in which:
      in a case that the speed of the vehicle is above the speed threshold, the vehicle is determined running, and the first communication unit is set to an operating state and the second communication unit is set to a stopped state; and
      in a case that the state where the speed of the vehicle is equal to or less than the speed threshold continues for a predetermined time period, the vehicle is determined stopping, and the first communication unit is set to a stopped state and the second communication unit is set to an operating state.

2. The communication device according to claim 1, wherein
   the control unit determines that the vehicle is stopped in a case that a parking manipulation is detected.

3. The communication device according to claim 1, further comprising:
   a third communication unit that is compliant with a third wireless communication standard, and is capable of operating simultaneously with the first communication unit and the second communication unit, the third wireless communication standard having a narrower communicable range than the first wireless communication standard and having a wider communicable range than the second wireless communication standard, wherein
   the control unit executes the switching control between the operation states in condition that the third communication unit is in the operation state.

* * * * *